United States Patent [19]

Nakajima

[11] 4,362,937
[45] Dec. 7, 1982

[54] ALPHA-RAY RADIATION SOURCE PHOTOGRAPHING DEVICE

[75] Inventor: Katsuaki Nakajima, Tokai, Japan

[73] Assignee: Doryokuro Kakunenryo Kaihatsu Jigyodan, Tokyo, Japan

[21] Appl. No.: 210,391

[22] Filed: Nov. 25, 1980

[30] Foreign Application Priority Data

Dec. 10, 1979 [JP]   Japan ................................ 54-170698

[51] Int. Cl.³ ............................................. G01N 23/00
[52] U.S. Cl. ..................................... 250/306; 250/308
[58] Field of Search ............... 250/253, 306, 307, 309, 250/358 R, 308

[56] References Cited

U.S. PATENT DOCUMENTS 3,408,496 10/1968 Sellers et al. ......................... 250/309
4,172,225 10/1979 Woldseth et al. .................... 250/306
4,194,115 3/1980 Whitehead et al. ................. 250/307

Primary Examiner—Bruce C. Anderson
Attorney, Agent, or Firm—Wenderoth, Lind & Ponack

[57] ABSTRACT

An alpha-ray radiation source photographing device comprising a glove box having an optical window formed in a part of a wall thereof, alpha-ray radiation scintillator, on which an alpha-ray radiation source-containing sample is placed, disposed within the glove box and adjacent to the optical window, and photographing mechanism which includes an optical multiplier tube, a close-up lens system and a camera and is disposed outside the glove box such as to oppose the scintillator. According to this photographing device, the postion of the alpha-ray radiation source can be photographed from the outside of the glove box without inserting a film therein.

6 Claims, 2 Drawing Figures

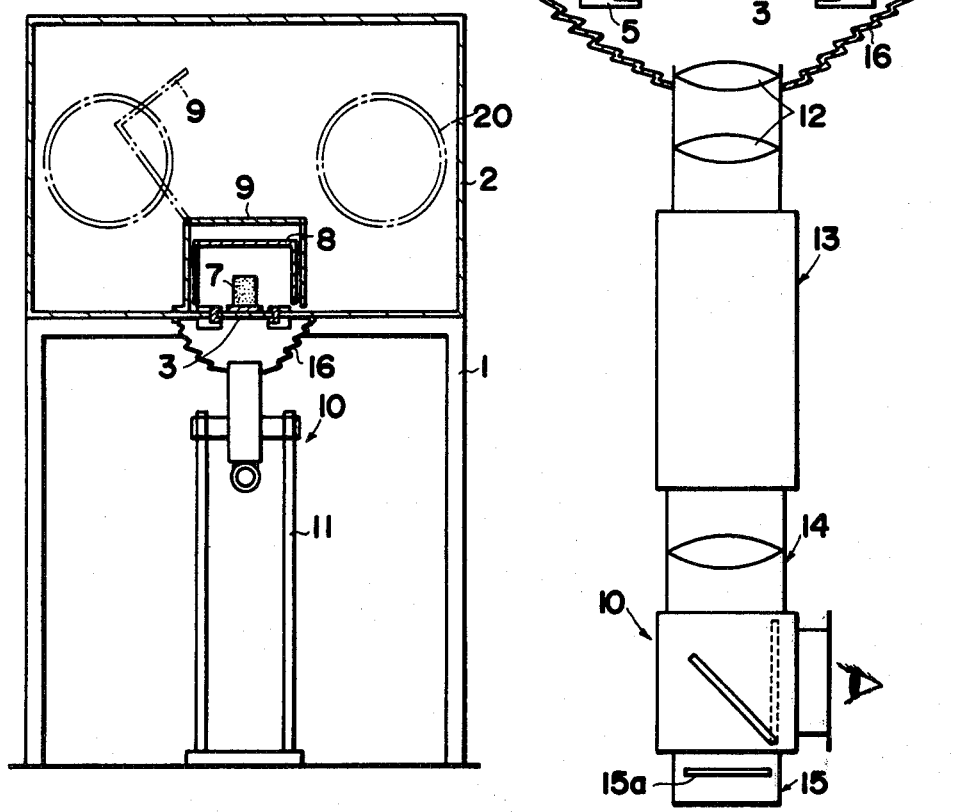

ALPHA-RAY RADIATION SOURCE PHOTOGRAPHING DEVICE

BACKGROUND OF THE INVENTION

The present invention relates to a device for photographing the position of an alpha-ray source and, more particularly, to a device suitable for photographing, for example, plutonium spots and uranium spots in a mixed-oxide fuel pellet.

It is necessary to grasp the state of dispersion of plutonium in a plutonium-containing nuclear fuel material.

According to a conventional method of grasping the state of dispersion of plutonium in such a fuel material, a film wrapped in a membrane is applied close to plutonium-containing nuclear fuel pellets to be exposed in a glove box. The film is then withdrawn from the glove box and subjected to contamination inspection. The film is thereafter developed.

In the above method, however, in which a film is inserted into a glove box, it is necessary to conduct an anti-contamination operation and a contamination inspection. Such a method is in fact troublesome and inefficient.

SUMMARY OF THE INVENTION

An object of the present invention is to eliminate the drawbacks encountered in a conventional photographing device of this kind.

Another object of the present invention is to provide a device which permits photographing the position of an alpha-ray radiation source from the outside of a glove box without inserting a film therein.

Still another object of the present invention is to provide a device which permits photographing the position of an alpha-ray radiation source simply, efficiently, with a high safety without causing a film to be contaminated.

An alpha-ray radiation source photographing device according to the present invention comprises a glove box, an optical window formed in a part of a wall of the glove box, an alpha-ray radiation scintillator, on which an alpha-ray radiation source-containing sample is placed, disposed within the glove box and adjacent to the optical window, and a photographing mechanism disposed outside the glove box such as to oppose the scintillator. This photographing mechanism includes an optical multiplier tube, a close-up lens system and a camera. In this photographing device, when alpha-ray radiation from the alpha-ray radiation source-containing sample impinges upon the scintillator, then light is emitted from the scintillator. The emitted light passes through the optical window to the outside of the glove box, and is amplified by the optical multiplier tube and photographed by the camera via the close-up lens system.

The above and other objects as well as the advantageous features of the invention will become apparent from the following description of the preferred embodiment taken in conjunction with the accompanying drawings.

BRIEF DESCRIPTION OF THE DRAWINGS

FIG. 1 is a front elevational view in section of an alpha-ray radiation source photographing device embodying the present invention.

FIG. 2 is an enlarged front elevational view in section of a principal portion of the embodiment shown in FIG. 1.

PREFERRED EMBODIMENT OF THE INVENTION

An embodiment of the present invention will be described with reference to the accompanying drawings.

A glove box 2 mounted on a base 1 is provided with an opening in a part of a bottom wall thereof. An optical flat 3 is air-tightly set in the opening with a packing 4 and a seal flange 5 to form an optical window. An alpha-ray radiation scintillator 6 consisting of ZnS is provided on the surface of the optical flat 3 which faces the interior of the glove box 2, such that a sample 7 containing an alpha-ray source, for example, a plutonium-containing nuclear fuel pellet, can be placed on the scintillator 6. A light shielding cover 8 and a protective cover 9 are detachably provided over the sample 7.

A photographing mechanism which is generally indicated at 10 is set up under the glove box 2. The photographing mechanism 10 is fixed to a platform 11 such that the photographing mechanism 10 is opposed to and in alignment with the scintillator 6. The photographing mechanism 10 consists primarily of a combination of relay type objective lenses 12, an optical multiplier tube 13, a precision close-up projection lens 14 and an instant development type camera 15, which are connected each other in the mentioned order as illustrated in FIG. 2. Light shielding bellows 16 are connected between the bottom wall of the glove box 2 and the relay type objective lenses 12. The light shielding cover 8 and light shielding bellows 16 make it possible to prevent the external light from entering the photographing system and to obtain a clearer photograph.

A photographing operation is conducted in the following manner. A sample 7 such as, for example, a plutonium-containing nuclear fuel pellet, is placed on the scintillator 6, and the light shielding cover 8 and protective cover 9 are put over the sample 7. This operation is carried out from the outside by using rubber gloves (not shown) fastened to glove ports 20. When alpha-rays radiated from the plutonium-containing nuclear fuel pellet impinge upon the scintillator 6 contacting the pellet, the scintillator 6 emits light at such a rate that is in proportion to the concentration of plutonium in the pellet. This light advances through the optical window of the optical flat 3 to the outside of the glove box 2 and passes through the objective lenses 12. Since the amount of such light emitted from the scintillator 6 is extremely small in general, it is amplified by the optical multiplier tube 13. The amplified light passes through the close-up lens 14 to be photographed on a film 15a in the camera 15 in accordance with the close-up system. Attached to the camera 15 is a finder 21 which permits a ready adjustment of a focus while viewing the object therethrough.

Unlike a conventional alpha-ray source photographing device, in which a film is inserted in the glove box to carry out a photographing operation, the photographing device according to the present invention, which has the above-described construction, permits photographing an alpha-ray source without inserting a film in the glove box. Therefore, the contamination of film never occurs. In addition, a photographing operation is conducted by a close-up system via the glove box, and any contamination is not given to the operator during the photographing operation. Since plutonium spots can be directly photographed, troublesome photographing operation as in the conventional photographing device can be omitted. Consequently, operation time can be shortened to around 1/5 of those by the conventional photographing device. In fact, a device according to the present invention permits the position of an alpha-ray source to be photographed with high safety and at a high efficiency.

What is claimed is:

1. An alpha-ray radiation source photographing device comprising a glove box, an optical window formed in a part of a wall of said glove box, an alpha-ray radiation scintillator, on which an alpha-ray radiation source-containing sample is placed, disposed within said glove box and adjacent to said optical window, and a photographing mechanism disposed outside said glove box such as to oppose said scintillator, said photographing mechanism including an optical multiplier tube, a close-up lens system and a camera, whereby alpha-ray radiation from said sample impinges upon said scintillator to emit light, and the emitted light advances through said optical window to the outside of said glove box and is amplified by said optical multiplier tube and photographed by said camera via said close-up lens system.

2. The alpha-ray radiation source photographing device according to claim 1, wherein said optical window comprises an optical flat having an inner surface facing the interior of said glove box, said optical flat being air-tightly set with a seal means in an opening provided in a wall of said glove box, said scintillator being placed on said inner surface of said optical flat.

3. The alpha-ray radiation source photographing device according to claim 1, wherein said glove box is provided therein with a releasable light shielding cover for enclosing said scintillator and said sample placed thereon.

4. The alpha-ray radiation source photographing device according to claim 1, wherein said photographing mechanism further includes an objective lens system disposed between said optical multiplier tube and said optical window of the glove box.

5. The alpha-ray radiation source photographing device according to claim 4, wherein the space between said objective lens system and said optical window of said glove box is enclosed with a light shielding bellows.

6. The alpha-ray radiation source photographing device according to claim 1, wherein said scintillator consists of ZnS.

* * * * *